May 13, 1969   A. K. CHITAYAT   3,443,871
SINGLE OPTICAL BLOCK INTERFEROMETER MEANS
Filed Dec. 7, 1965

INVENTOR.
ANWAR K. CHITAYAT
BY James P. Malone

United States Patent Office 3,443,871
Patented May 13, 1969

3,443,871
SINGLE OPTICAL BLOCK INTERFEROMETER MEANS
Anwar K. Chitayat, Plainview, N.Y., assignor to OPTOmechanisms, Inc., Plainview, N.Y.
Filed Dec. 7, 1965, Ser. No. 512,111
Int. Cl. G01b 9/02
U.S. Cl. 356—106     3 Claims

ABSTRACT OF THE DISCLOSURE

A single solid optical block interferometer having a plurality of external surfaces. A first surface is positioned to refract an input beam to a second surface which splits the beam into second and third beams. The second beam is internally reflected by a third surface back to the second surface. The third beam is transmitted externally to a movable reflector which reflects the beam back to the second surface to form interference fringes on said second surface.

---

This invention relates to interferometers and more particularly to such means using a single block prism to provide the interference pattern.

In optical interferometers, means must be provided to split the beam into two sections and then to recombine them again to observe light fringes. In linear measuring interferometers, one may use a beam splitter and a mirror as in "Michelson" type arrangement, Koesters prism, or other techniques. In all these, the fixed member of the interferometer contains either:

(A) Two or more optical components separated from each other.

(B) Two optical components cemented together, such as "cube beam splitter" silvered in a double beam arrangement, or Koesters prisms which contain two cemented elements. Several other configurations are possible using cemented elements.

The present invention details the utilization of a single optical prism, which has no cemented elements. In this manner, the stability of the interferometer is superior to any multi-element arrangement. In addition, the cost of the interferometer is appreciably reduced since no cementing is required and only one element is used, which can be mounted directly on the interferometer base.

Accordingly, a principal object of the invention is to provide new and improved interferometer means.

Another object of the invention is to provide new and improved interferometer means using a single block optical prism to provide the interference pattern.

Another object of the invention is to provide new and improved interferometer means comprising a source of radiant energy beam, a single interferometer prism and a movable reflector.

Another object of the invention is to provide new and improved optical block means for an interferometer comprising a solid block of radiant energy beam conductive having a first surface, a second semi-reflecting surface, said first surface being adapted to receive and deviate a first beam to said second surface, said second semi-reflecting surface being adapted to split said first beam into second and third beams, a third surface on said block and having an internally reflecting surface adapted to reflect said second beam back to said semi-reflecting surface, said third beam being adapted to be transmitted to a movable reflector and back to said semi-reflecting surface, whereby an interference fringe will occur on said semi-reflecting surface proportional to movement between said reflecting surface and said movable reflector.

These and other objects of the invention will be apparent from the following specification and drawings of which:

Figure 1:
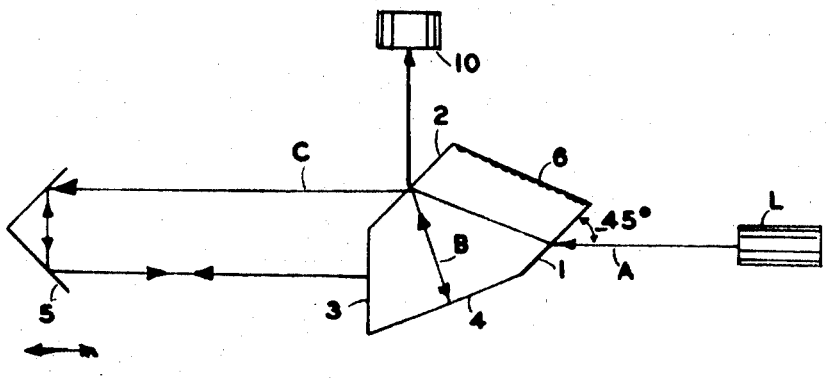
FIGURE 1 is a schematic diagram of a first embodiment of the invention.

FIGURE 1 illustrates a double beam interferometer in which a collimated beam A arrives from the laser L. This beam may be collimated through a beam spreading telescope, after arriving from the C.W. laser. The beam A is directed at face 1 of the optical block O. The beam is then deivated to face 2 which contains a semi-reflecting coating, the beam is divided into two equal part beams B and C.

The beam B is reflected to surface 4 which is a reflecting surface directing the illumination back on itself, to face 2.

The beam C is transmitted through the optical block, to the moving corner reflector 5 which directs it back at surface 3 of the optical block. This surface 3 is mirrored to reflect the beam back to the corner cube and back to surface 2 of the interferometer. This beam is reflected by the beam splitting layer 2 back to the detector 10.

As noted above, the arrangement allows the recombination of beams B and C to develop the interferometric fringes, which are observed by the photodetectors or viewing means 10.

The face 6, connecting surfaces 1 and 2, has a diffusing surface.

This prevents double images since any reflection from surface 1 is absorbed by the diffusing surface 6 without arriving at the detectors. A stop may be substituted for the diffusing surface to achieve the same results.

Figure 2:
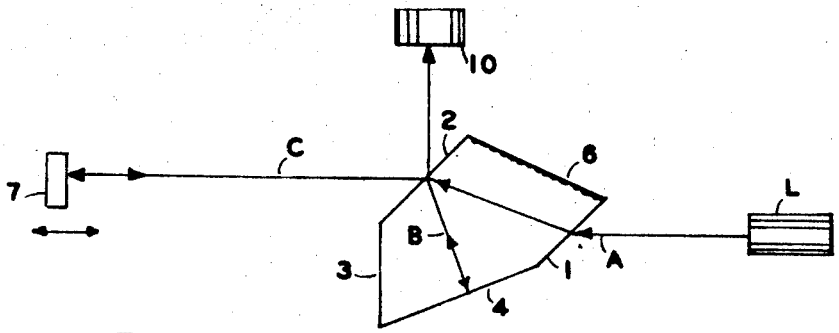
FIGURE 2 is a schematic diagram of a modification of the invention.

FIGURE 2 illustrates the utilization of the same block as a single beam interferometer. Here the beam is transmitted to a moving mirror 7 instead of a moving corner reflector. Surface 3 may remain as a deflecting surface, or it may now be ground or diffused.

In order to sense direction if desired, it is necessary to retard ½ of the superimposed beam by ¼ of a fringe. This may either be achieved by:

(A) Placing a phase retardation plate between the corner cube and the optical block, or (B) It may be achieved by placing a quarter fringe retardation coating on half of surface 4.

Figure 3:
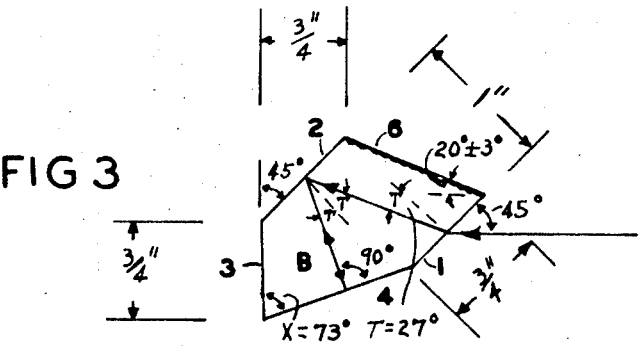
FIGURE 3 is a diagram illustrating the details of the embodiment of FIGURES 1 and 2.

FIGURE 3 illustrates the general outline and dimensions of an embodiment of the optical block. The exact dimensions are dependent on the index of refraction $n$ since $\sin o = \sin 45°/n$.

FIGURE 3 is the top view. The top and bottom sides of the prism are preferably flat and parallel. Note that surfaces 1 and 2 are parallel and surface 3 is perpendicular to beams C.

The angle X is approximately 73° for a typical embodiment of a glass prism. The surface 4 is cut and polished so that it directly reflects the beam B to the surface 2. The surface 4 is preferably polish flat to $\frac{1}{20}$ of a wave length. The surface 1 is preferably polished flat to $\frac{1}{10}$ of a wave length and an anti-reflecting coating to the wave length of the light beam for instance, which may be red of 6328 ang. The surface 2 is preferably polished flat to $\frac{1}{20}$ of the wave length with approximately 45% to 55% reflection and 45% to 55% transmission. Surfaces 3 and 4 are preferably polished flat to $\frac{1}{20}$ of the wave length and preferably have at least 90% reflection. Surface 6 is diffused or frosted for minimum reflection.

Many modifications may be made by those who desire to practice the invention without departing from the scope thereof which is defined by the following claims:

I claim:
1. Optical block means for an interferometer comprising,
a single solid block of radiant energy beam conductive material having a first planar transmitting surface,
a second planar semi-reflecting surface on said block, said second surface being substantially parallel to said first surface,
said first surface being adapted to receive and deviate a first beam to said second surface,
a second semi-reflecting surface being adapted to split said first beam into second and third beams,
a third internally reflecting planar surface on said block adapted to reflect said second beam back to said semi-reflecting surface,
said third beam being adapted to be transmitted to a movable reflector positioned to move along said third beam and back to said semireflecting surface, whereby an interference fringe will occur on said semi-reflecting surface proportional to movement between said reflecting surface and said movable reflector, all of said surfaces being external surfaces of a single solid block.

2. Apparatus as in claim 1 wherein said block is of glass.

3. Apparatus as in claim 1 wherein said movable reflector is a corner reflector and said block has a fourth externally reflective surface perpendicular to said third beam whereby said third beam is reflected back by said corner reflector to said fourth surface and then back to said corner reflector and back to said second surface to provide a double beam interferometer.

References Cited
UNITED STATES PATENTS
3,145,251   8/1964   Woodson _____ 88—14

RONALD L. WIBERT, *Primary Examiner.*

C. CLARK, *Assistant Examiner.*

U.S. Cl. X.R.
350—286, 170